(12) United States Patent
Ibbitson et al.

(10) Patent No.: US 6,585,207 B2
(45) Date of Patent: Jul. 1, 2003

(54) SAFETY CLAMP HOLDER

(75) Inventors: Scott Alan Ibbitson, Trappe, PA (US); Thomas John Procaccio, Aston, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/939,904

(22) Filed: Aug. 28, 2001

(65) Prior Publication Data

US 2002/0074470 A1 Jun. 20, 2002

Related U.S. Application Data

(60) Provisional application No. 60/230,313, filed on Sep. 6, 2000.

(51) Int. Cl.[7] .................................................. F16B 1/00
(52) U.S. Cl. ............................ 248/229.2; 248/229.2; 248/230.1
(58) Field of Search .......................... 248/229.2, 229.1, 248/230.1, 540, 541, 313, 68.1, 229.15; 24/335, 336, 531, 556, 562, 539

(56) References Cited

U.S. PATENT DOCUMENTS

| | | | | |
|---|---|---|---|---|
| 385,484 | A |   | 7/1888 | Stitzel |
| 2,052,600 | A |   | 9/1936 | Boss |
| 2,638,301 | A | * | 5/1953 | Smith ..................... 248/229.15 |
| 2,970,798 | A | * | 2/1961 | Fritchle et al. ........ 248/224.25 |
| 3,893,813 | A | * | 7/1975 | Johnson ....................... 422/104 |
| 4,787,591 | A | * | 11/1988 | Villacorta ................. 248/316.7 |
| 5,090,742 | A | * | 2/1992 | Cohen et al. ............... 285/114 |
| 6,425,561 | B2 | * | 7/2002 | Wooten et al. ........... 248/229.1 |

* cited by examiner

*Primary Examiner*—Ramon O. Ramirez
(74) *Attorney, Agent, or Firm*—Stephen E. Johnson; Gregory M. Hill

(57) ABSTRACT

An adjustable clamp holder having multiple securing mechanisms for each attachment structure of the clamp body is disclosed. The clamp has utility in fastening together support rods and supporting an apparatus or laboratory equipment. The clamp holder obviates the limited securing capabilities and safety concerns associated with previously known clamping devices.

17 Claims, 3 Drawing Sheets

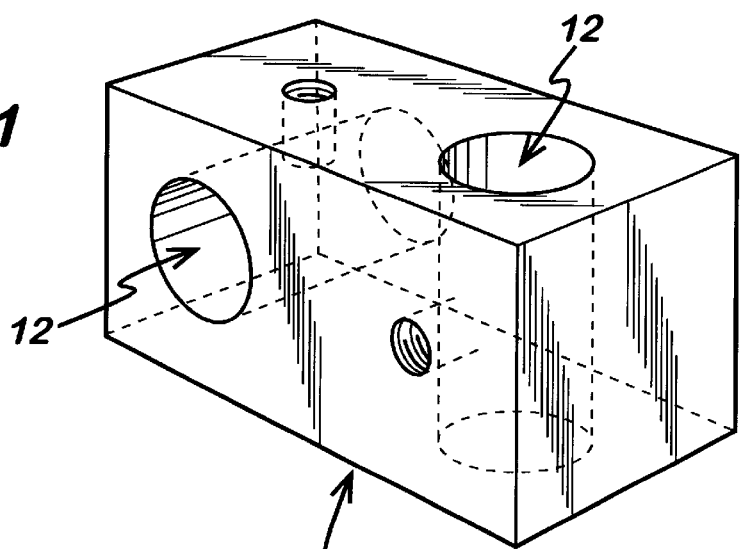
Fig. 1.1
*(Prior art)*
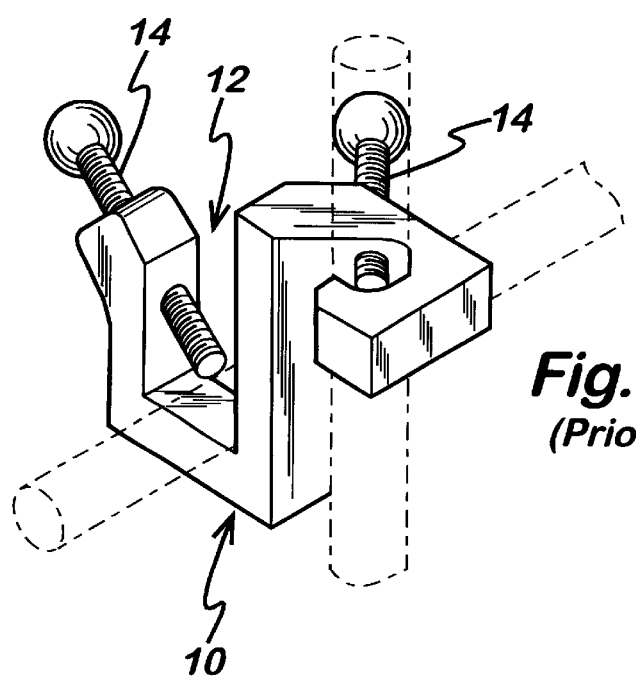
Fig. 1.2
*(Prior art)*
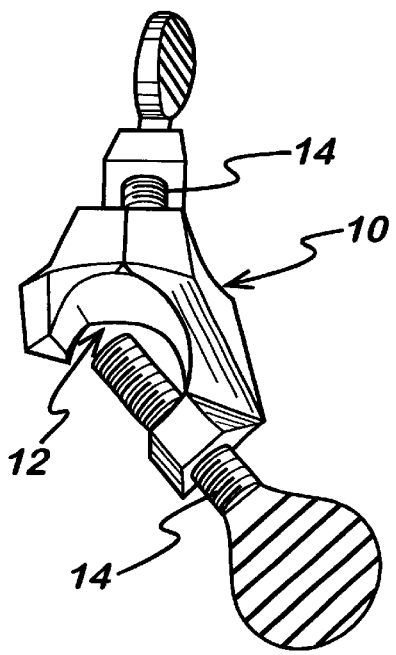
Fig. 1.3
*(Prior art)*

SAFETY CLAMP HOLDER

This is a non-provisional application of prior pending U.S. provisional application Ser. No. 60/230,313 filed Sep. 6, 2000.

The present invention relates to adjustable clamp holders suitable for safety securing and supporting a variety of laboratory equipment.

BACKGROUND OF INVENTION

As shown in FIG. 1, conventional clamp holders used in fastening together two support rods consist of two elements, a gripping or securing mechanism and an attachment structure. The attachment structure, also known as clamp body 10, comprises spatially separated openings by means of which the clamp can be placed directly in a desired position on a support rod, the opening 12 having a closed, grooved or V-shaped slot for receiving the support rods. Each opening of the clamp body is associated with a single securing mechanism 14. The securing mechanism typically comprises an object such as a single thumb screw or allen-type screw for fastening the attachment structure to the support rod. The openings may be in a fixed position relative to each other or they may be connected by a swivel joint. The usual practice in the art has been to construct the clamp holder in such a way that each securing mechanism is at an opposite end of the clamp holder oriented at an angle to each other. Laboratory clamp holders are typically used in the construction of laboratory frames or lattices and to secure a specific laboratory apparatus. In securing a specific laboratory apparatus, one opening of the clamp body is fastened to a supporting rod that comprises a lattice or frame and the second end is fastened to a rigid extension rod used as a supporting member for laboratory equipment. The clamp holders can be adjusted for constructing lattice works of support rods that are intended to hold a variety of items ranging from small, lightweight objects, such as glassware, to large, heavy objects, such as mechanical stirrers.

Commercially available laboratory clamp holders are manufactured from a few specific metals such as white metal, aluminum alloys and steels. Typical laboratory clamps used for holding support rods at different angles in the construction of lattices and to secure laboratory equipment are disclosed in patents, such as U.S. Pat. Nos. 2,638,301 and 2,052,600, design patents, such as U.S. Design Pat. No. 385,484 and are known in the prior art by a variety of tradenames, such as FLEXAFRAME®and CASTALOY®. Clamps of the type known prior to the present invention are illustrated in FIG. 1. Clamps of this type have been widely used and have proved to be moderately successful, however, from established laboratory safety and practice perspectives, such clamps have several key limitations and disadvantages.

Commercially available clamp holders are made of metal alloys that are relatively maleable, have limited mechanical strength and easily corrode in a laboratory environment. Commercially successful clampholders, however, are prone to corrosion and mechanical failure over a relatively short time. Moreover, there is a limited securing capability with attendant safety concerns associated with such clamps, since the clamp body possesses only a single securing mechanism for each opening of the clamp body. In cases where the clamp supports heavy objects, such as mechanical stirrers, it is difficult to safely secure the stirring apparatus for long periods of time. Loads exerted on the securing mechanism and torque associated with mechanical vibrations often compromise the securing mechanism, or in the worst case, cause complete failure of the securing mechanism or the clamp body, creating a safety hazard. Due to the maleable alloys that comprise the clamp body and the securing mechanism, there is a finite number of times the clamp is effective in securing laboratory equipment.

Safety, reliability and ease of use are important considerations with regard to a clamp holder during critical moments in a laboratory experiment. Situations frequently arise when a heavy or bulky reaction flask, containing expensive, corrosive and/or toxic reagents, has to be mechanically stirred or safely transferred from one experimental area to another, such as a vented space or within a venting hood from a heating bath to a cooling medium. Success or failure can be governed by the manner with which a scientist, engineer or skilled technician can work safely and efficiently with the secured apparatus. Additionally, the introduction of syringes, delivery of reagents, cooling or heating baths, hoses, and stands to a secured apparatus during the course of a single reaction requires considerable dependence of the securing system of clamps to carry out a safe and efficient experiment. The safe and successful performance of secured apparatus is further hampered by difficulties in the ease of manipulation of the clamps. Clearly, there is a need for a clamp holder that can secure and release an object such as a reaction flask, safely and effectively and that provides an efficient and safe securing means for supporting laboratory equipment.

SUMMARY OF THE INVENTION

Accordingly, it is an object of this invention to provide a clamp holder having a plurality of securing mechanisms in each opening of the clamp body for securing support rods to the clamp body.

It is an object of this invention to provide a clamp holder which has numerous advantages over existing clamps It is another object of this invention to provide a clamp holder which permits the safe and efficient fastening and securing of supporting rods for the construction of a framework or lattice.

It is another object of this invention to provide a clamp holder which permits the safe and efficient fastening and securing of laboratory equipment.

It is yet another object of this invention to provide a clamp holder which can be manufactured with mechanically stronger and safer materials.

It is yet another object of this invention to provide a clamp holder from which the clamped object can be secured or released using only one hand or may be easily handled or adjusted by a single person.

It is yet another object of this invention to provide a clamp holder for holding securely one or more objects of a variety of shapes, weights and sizes.

It is yet another object of this invention to provide a clamp holder which can be easily secured to an existing lattice and allows for the easy adjustment of the vertical or horizontal displacement in space of the object it secures.

It is yet another object of this invention to provide a useful relatively lightweight, durable, inexpensive clamp that is resistant to corrosion.

The inventors have surprisingly discovered a functional clamp holder which satisfies all the above objects of this invention. Other objects and advantages of the invention will become apparent from the following description considered in conjunction with the accompanying drawings.

BRIEF DESCRIPTION OF THE DRAWINGS

FIG. 1 is a perspective illustrating clamps known from the prior art.

DETAILED DESCRIPTION OF THE INVENTION

The present invention is directed to an adjustable, clamp holder for safely securing support rods and for supporting laboratory equipment. The term "Adjustable" applies to the securing mechanism and its orientation to the attachment structure. The securing mechanism can be mechanically adjusted to secure objects of varied dimensions. The angular orientation of the attachment structures may also be adjusted in accordance with the invention. The term "Laboratory" equipment applies to any mechanical equipment, apparatus or devices used in a laboratory, commercial or industrial environment. Accordingly, a functional and durable clamp holder is disclosed that can secure an object, allowing the user to safely and efficiently, secure and release the clamp body from the object. The plurality of securing mechanisms in each opening of the clamp body provides the key utility for securing an object in accordance with the invention. The object can consist of supporting rods or secured laboratory equipment. The clamp holder of the invention is constructed of two parts, an attachment structure, also known as a clamp body 10, and a plurality of securing mechanisms 14 for each opening 12 of the clamp body 10, preferably two on each side.

A key feature of the clamp of the present invention is that a plurality of securing mechanisms are usefully employed. Clamps known from the prior art have a single securing mechanism associated with each opening of the attachment structure (FIG. 1). There is a limited securing capability and safety concerns associated with such clamps, since the clamp body possesses only a single securing mechanism for each opening of the clamp body. In cases where the clamp holder supports heavy objects, such as mechanical stirrers, it is difficult to safely secure the stirring apparatus for long periods of time. Loads exerted on the securing mechanism and torque associated with mechanical vibrations often compromise the securing mechanism, or in the worst case, cause complete failure of the securing mechanism or the clamp body, creating a safety hazard. Due to the maleable alloys that comprise the clamp body and the securing mechanism, there is a finite number of times the clamp is effective in securing laboratory equipment. All of the above-mentioned limitations are obviated with clamps having a plurality of securing mechanisms. The inventors have usefully employed two securing mechanisms for every attachment structure of the clamp holder. A plurality of securing mechanisms for each opening of the clamp body are embodied in the present invention and the inventors have found that two securing mechanisms for each opening are preferred for providing the necessary securing requirements for safely using the clamp holder.

Figure 3:
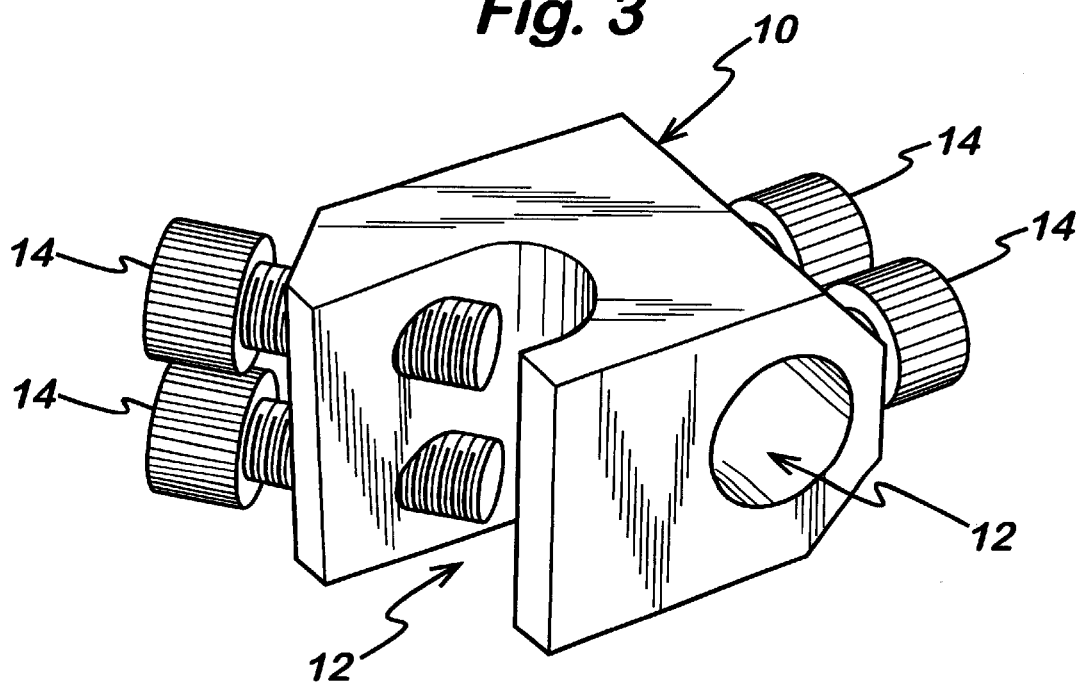
FIG. 3 is a perspective illustrating a preferred embodiment of the safety clamp.
Figure 4:
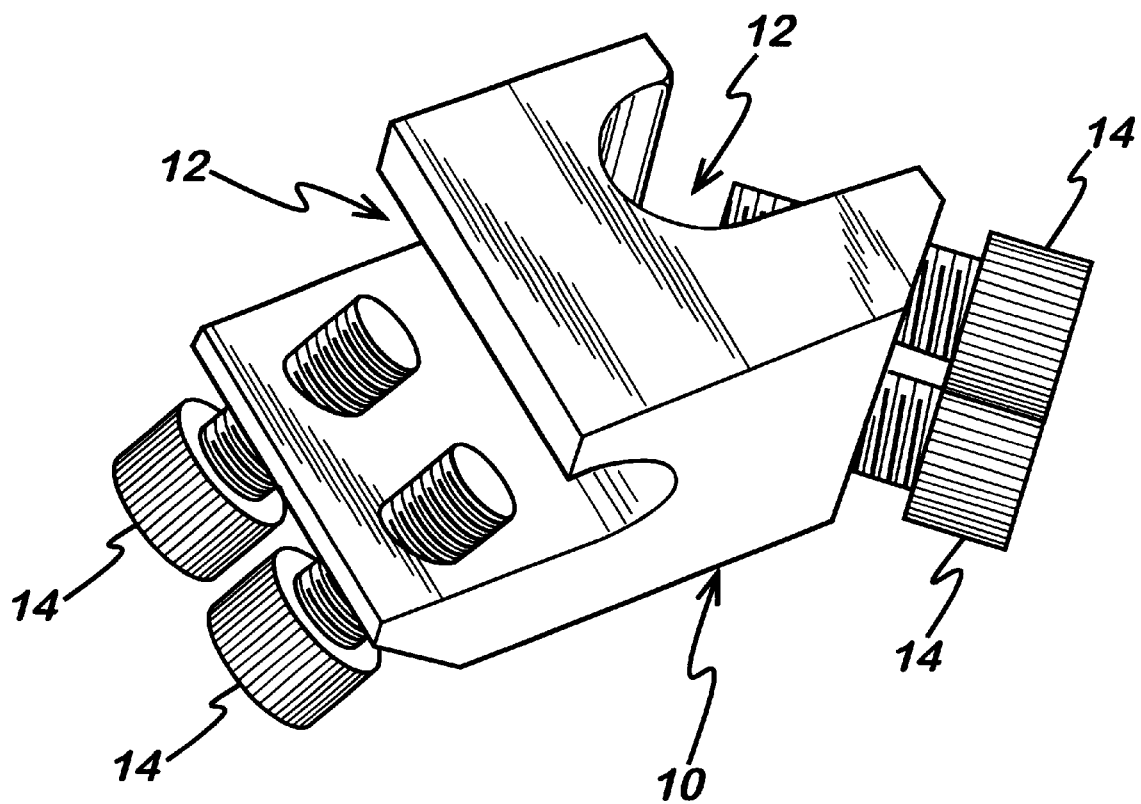
FIG. 4 is a perspective illustrating yet another preferred embodiment of the safety clamp.

Either one or both of the openings in the clamp holder may be further closed off such that they allow a support rod to slide through either end of the holes that result and variations of the safety clamp are illustrated in FIGS. 3 and 4. The securing mechanisms are embodied in threaded, locking or combination devices well known in the art. Preferred embodiments are threaded, machined devices having standard or metric threads and head design types that include, but are not limited to, slotted, philips, hex-head, allen-key, headless, socket, cap, triwing, button, jiglatch, spanner, notched spanner, torx, and thumb. Thumb types are further embodied in tee, knurled and rosette. Tips of the threaded devices are embodied in the following types, which include but are not limited to pointed, cup point, flat point, half dog point and hollow lock. All the tip types can be usefully employed with knurled ends. The most preferred embodiment is a standard threaded, knurled, allen-key socket cap screw with a flat point tip. The securing device can be manipulated by hand or mechanically using tools well known in the art.

The clamp body is manufactured from commercially available metal alloys known in the art to have sufficient mechanical strength, preferably metal alloys of aluminum, stainless steels and low carbon steels. Corrosion resistant alloys are preferred. The openings of the clamp are preferably machined into the body and may also be disposed at a range of angles from each other. Optionally, a plurality of mutually orthogonal openings can be machined in to a clamp body or a plurality of openings have a plurality of angular or geometric relationships can be machined into a clamp body according to an embodiment of the invention.

The clamp holder of the present invention allows the safe and secure fastening of support rods to form a lattice or securing framework and serves to support a variety of laboratory equipment. The safety clamp securely fastens and stabilizes lab equipment, particularly heavy equipment that exerts significant torque of the clamp or equipment that generates significant mechanical vibrations. Torque and vibrations that would normally cause failure of clamps known in the prior art, have no effect on the safety clamp of the present invention. The adjustment of the vertical and horizontal positions of the clamp may be accomplished with ease and efficiency. The clamp design allows a wide array of objects to be secured and released at the securing means without accidentally pulling away or dislodging from the securing lattice or stand.

The clamp body of the present invention may be easily manufactured as a one-piece unit or in segments from commercially available metals and their alloys. Preferred metal alloys are Al (e.g. ASTM 6061), low carbon steels (e.g. ASTM 1018), stainless steels (e.g. ASTM T-316) and their respective equivalents. Equivalent materials such as ceramic materials, ceramic composites, modified and/or reinforced plastics and engineering plastics are usefully employed in accordance with the invention. Any biological materials having the requisite mechanical strength or any materials developed from biotechnological processes can be usefully employed in accordance with the present invention. The openings in the clamp body that are fastened to supporting rods may be easily machined in a variety of configurations, such as V-shaped, slotted, cylindrical or grooved. In a preferred embodiment, the openings are grooved to conform to a cylindrically shaped support rod. Moreover, the openings in the clamp body may be machined such that they are easily disposed at a variety of angles to one another. In separate embodiments, they may be machined such that the openings may be disposed at angles ranging from 30° to 180° from each other, depending on the orientation required to support a particular piece of laboratory equipment. In a preferred embodiment, the openings are such that they are mutually perpendicular to each other.

The exact dimensions of the clamp holder are dictated by the particular application. At a minimum, each opening in the clamp body should have at least two holes which engage securing mechanisms to fasten the clamp body to support rods.

The opening gap and inside diameter of the clamp body usefully employed in accordance with the invention is embodied in a range of sizes. In a preferred embodiment, the diameter of the securing holes are about half the diameter of the openings which accept standard lattice support rods. As an example, a clamp opening of about 13.3 mm is usefully employed with standard lattice support rods 12.5 mm in diameter. The tolerance of the opening diameter is relative to the supporting rod and the rod diameter is preferred to have a range of 85% to 98% relative to the opening.

The inventors have discovered that clamp holders having the dimensions given above accept, secure, and safely release laboratory equipment such as mechanical stirrers, holders for reaction vessels and flasks. The clamp reproducibly secures any equipment or object and protects its contents safely. The clamp further prevents held objects and equipment from slipping when force is exerted in the vertical direction during the course of an experiment (for example, when fitting a metal stirrer in to a reaction vessel through septa or a sealing mechanism).

The adjusting screws are easily manipulated by finger or mechanical keys to adjust the securing forces of the clamp. The adjusting screws of the invention are the clear solution to a number of problems associated with screws of existing clamps which the present invention circumvents. These problems include the tendency of the screws to corrode until they can no longer be turned, the need for an inconvenient amount of time and level of dexterity to manipulate the screws (especially while wearing personal protective equipment). In addition, the present invention is mechanically stronger and safer. A small clamp holder can accommodate all miniature sized labware and laboratory equipment. The same argument applies to heavier and bulkier objects, in which a larger clamp holder can be designed.

The inventors have also found that the clamp holder imparts better flexibility to the secured laboratory equipment and distributes the stress created during securing of the equipment, while at the same time retaining the strength and rigidity required of the support rod. The securing mechanism is adjustable and aids in applying greater and uniform pressure to supporting the rods at specific points around the object, resulting in a safer and more secure grip.

Figure 2:
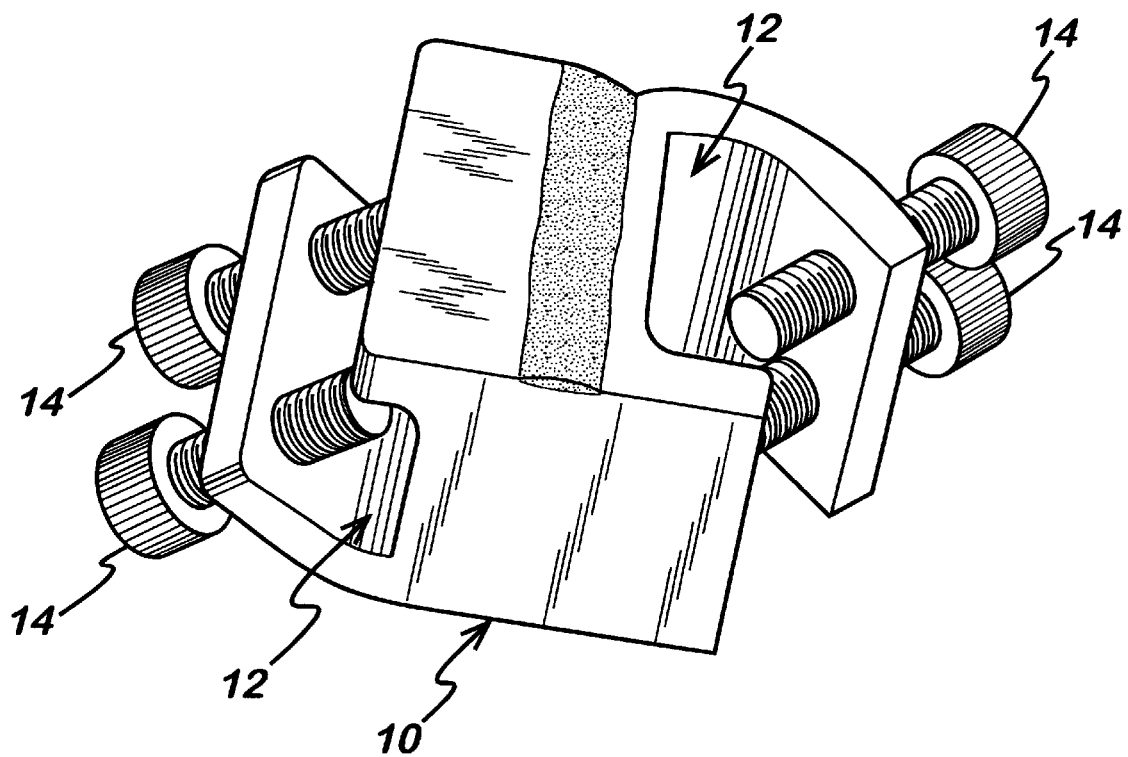
FIG. 2 is a perspective illustrating a prototypical safety clamp of the invention.

Departures from the prototypical design and configuration shown in FIG. 2 can be envisioned readily. These include configurations illustrated in FIGS. 3 and 4. Alternatively, multiple openings that are mutually perpendicular may also be machined in to the clamp body dictated by the particular application.

Another useful device of which the clamp holder would be an integral part can be a lightweight miniature ring stand for use in holding and transporting a reaction flask to and from different experimental areas (e.g. a fume hood or drybox). At present there is no adequate means of safely transferring a reaction vessel (usually a round-bottom flask) from the bench into and out of a fume hood. A miniature or large stand made of solid material (e.g., metal or engineering plastic) and the clamp, used in conjunction with or made part of a ring stand assembly, can be used to secure a reaction vessel in an upright position without safety concerns, such as contamination due to spillage. The entire assembly can be small and light enough to be carried on a tray without extra effort or large and sturdy enough to handle large reaction vessels and the heavy equipment associated with them.

It should be apparent from the foregoing that the present invention contemplates a multiple clamp holder arrangement that can be adjusted to join rigid supports at specifically desired angles which allows for the easy clamping and releasing of many kinds of objects in a wide array of spatial orientations. It should be apparent that the present invention also contemplates a device that secure laboratory equipment to one end of the supporting rod allows for the easy anchoring, positioning, and releasing of the clamp assembly with respect to an existing lattice framework, portions thereof, ring stand, or other fixed or portable support.

It should likewise be obvious that various changes may be made to the described embodiments of the present invention without departing from the scope and spirit thereof, that a clamp of virtually any size and configuration can be produced to fit any particular need, and therefore the invention is not limited by that which is illustrated in the drawings and described in the specification.

We claim:

1. An adjustable laboratory clamp holder comprising a clamp body having at least two attachment structures, disposed at angles ranging from 30° to 180° relative to each other, wherein each attachment structure has a plurality of securing mechanisms.

2. The clamp holder according to claim 1, wherein each attachment structure has a shape selected from the group consisting of V-shaped, slotted, grooved, cylindrical and combinations thereof.

3. The clamp holder according to claim 1, wherein each attachment structure is associated with two securing mechanisms.

4. The clamp holder according to claim 1, wherein each securing mechanism is a threaded, machined device.

5. The clamp holder according to claim 4, wherein the securing devices have standard or metric threads and have head types selected from the group consisting of slotted, philips, hex-head, allen-key, headless, socket, cap, triwing, button, jiglatch, spanner, notched spanner, torx, and thumb.

6. The clamp holder according to claim 4, wherein the securing device can be manipulated by hand or mechanically.

7. The clamp holder according to claim 1, wherein each securing mechanism is a threaded, machined device having a flat point tip.

8. The clamp holder according to claim 7, wherein the tips are selected from the group consisting of pointed, cup point, flat point, half dog point, hollow lock and combinations thereof.

9. The clamp holder according to claim 7, wherein the tips can be usefully employed with knurled ends.

10. The clamp holder according to claim 1, wherein each securing mechanism is a standard threaded, knurled, allen-key socket cap screw device.

11. The clamp holder according to claim 1, wherein the attachment structures encircle supporting rods or laboratory equipment.

12. The clamp holder according to claim 1, wherein the attachment structures partially encircle supporting rods or laboratory equipment.

13. The clamp holder according to claim 1, wherein the attachment structures are mutually perpendicular to each other.

14. An adjustable laboratory clamp holder comprising a clamp body having at least two attachment structures, each attachment structure is disposed at an angle of 90° to each other and has a plurality of securing mechanisms, wherein the securing mechanism consists of a standard threaded, knurled, allen-key socket cap screw device.

15. The clamp holder according to claim 14, wherein the securing device can be manipulated by hand or mechanically.

16. An adjustable laboratory clamp holder comprising a clamp body having two attachment structures, each attachment structure is disposed at an angle of 90° to each other and has two securing mechanisms for each attachment structure, wherein the securing mechanism consists of a standard threaded, knurled, allen-key socket cap screw device.

17. The clamp holder according to claim 16, wherein the clamp body is manufactured from materials selected from the group consisting of aluminum, low carbon steels, stainless steel, ceramic composites, modified plastics, reinforced plastics and engineering plastics.

* * * * *